United States Patent [19]
Molnar

[11] Patent Number: 5,877,574
[45] Date of Patent: Mar. 2, 1999

[54] DYNAMOELECTRIC MACHINE

[75] Inventor: David T. Molnar, Fort Wayne, Ind.

[73] Assignee: General Electric Company, Schenectady, N.Y.

[21] Appl. No.: 791,116

[22] Filed: Jan. 30, 1997

[51] Int. Cl.⁶ ..................................................... H02K 5/00
[52] U.S. Cl. ........................... 310/215; 310/71; 310/156; 310/214
[58] Field of Search .................................... 310/156, 215, 310/214, 71

[56] References Cited

U.S. PATENT DOCUMENTS

| | | | |
|---|---|---|---|
| 3,122,667 | 2/1964 | Baciu | 310/45 |
| 3,334,255 | 8/1967 | Peters | 310/215 |
| 4,340,829 | 7/1982 | McCoy | 310/71 |
| 4,481,435 | 11/1984 | Loforese | 310/71 |
| 4,728,836 | 3/1988 | Wrobel | 310/71 |
| 4,742,259 | 5/1988 | Schafer et al. | 310/156 |
| 5,306,976 | 4/1994 | Beckman | 310/251 |
| 5,610,457 | 3/1997 | Kurita | 310/68 B |

FOREIGN PATENT DOCUMENTS

| | | |
|---|---|---|
| 60121955 | 6/1985 | European Pat. Off. . |
| 0549427 A1 | 12/1992 | European Pat. Off. . |
| 0549429 A1 | 12/1992 | European Pat. Off. . |
| 05236718 | 9/1993 | European Pat. Off. . |
| 924.292 | 7/1947 | France . |
| 31 50 970 | 6/1983 | Germany . |
| 4401361 A1 | 1/1994 | Germany . |
| 693310 | 8/1965 | Italy . |
| G9303414.8 | 8/1994 | Switzerland . |

*Primary Examiner*—Nestor Ramirez
*Assistant Examiner*—Thanh Lam
*Attorney, Agent, or Firm*—Senniger, Powers, Leavitt & Roedel; Wayne O. Traynham

[57] ABSTRACT

A dynamoelectric machine having a rotor constructed to facilitate position sensing and a stator constructed to retain slot liners in the stator while reducing flux leakage between adjacent teeth of the stator. The rotor includes permanent magnets which project beyond one axial end of the rotor and the stator. Thus, a position sensor may be positioned in registration with the overhanging portion of the magnet. Slots in the stator are shaped to hold an insulating slot liner in the slot, and prevent the liner from slipping into the stator bore. The slots are also angularly formed near their inner ends to increase the space between adjacent stator teeth for reducing the flux leakage between the teeth.

22 Claims, 3 Drawing Sheets

DYNAMOELECTRIC MACHINE

BACKGROUND OF THE INVENTION

This invention relates generally to dynamoelectric machines and more particularly to a stator and rotor construction therefor.

Dynamoelectric machines of the type to which the present invention generally relates have a stator including a stator core and windings on the stator core, and a rotor including a rotor core and permanent magnets mounted on the periphery of the rotor core. The rotor core and stator core are typically manufactured by stamping a number of rotor and stator laminations from a ferromagnetic sheet material and stacking the laminations together in respective stacks. Generally, electronically commutated motors require detection of the rotor position in order to commutate the windings on the stator. A Hall device is one common type of sensor used to detect the rotor position. In order for a Hall device to operate, it is necessary for it to be at least partially in radial registration with the permanent magnets inside the motor. The Hall device detects the passing magnetic fields of the permanent magnets indicative of the rotor position and transmits this information to a control in the motor for use in commutating the windings.

However, conventionally the rotor core and permanent magnets mounted on the rotor core have been located entirely within the stator core. A Hall device will not operate properly when located at an axial end of the permanent magnets. The requirement for a minimal air gap between the rotor and the stator in the stator bore rules out placing the sensor between the rotor and stator. Frequently, the rotor core and the permanent magnets mounted thereon are made longer than the stator core so that the permanent magnets are exposed outside the stator core. In this configuration it is possible for a Hall device to extend from a control board to a position in partial radial alignment with the permanent magnets. Unfortunately, making the rotor core longer than the stator core requires that more rotor laminations be punched than stator laminations. There must be a back up die in the manufacturing facility to produce the additional rotor laminations required to form the longer rotor cores. Thus, there is additional manufacturing expense caused by the need for additional machinery as well as the additional material used for the rotor core.

The stator laminations making up the stator core each have slots on an inner diameter of the stator lamination which open into a central opening of the stator lamination. When the stator laminations are stacked together, the slots are aligned with slots of other stator laminations to form elongate stator core slots. Adjacent stator core slots define teeth of the stator core on which the magnet wire forming the stator windings are wound. The magnet wire is received in the slots. To provide additional electrical insulation between the magnet wire and the stator core slot liners are placed into the stator core slots prior to the winding of the magnet wire so that the liners prevent contact of the magnet wire with the stator core.

An example of the slot liner of this type is shown in co-assigned U.S. Pat. No. 5,306,976. The liner has a transverse wall, opposing side walls and flaps extending from edges of the side walls. The flaps overlap so that the slot liner completely encircles the magnet wire in the slots. However, the flaps can be deflected apart by wire being wound on the stator core to permit the wire to enter the slot. The slots are formed with radially opposing inner and outer surfaces to engage the slot liner and hold it in the slot. It is desirable to further increase the spacing between the stator teeth at the end of the slot in order to decrease flux leakage between adjacent teeth.

SUMMARY OF THE INVENTION

Among the several objects and features of the present invention may be the provision of a dynamoelectric machine in which electronic position sensing devices are readily employed; the provision of such a dynamoelectric machine which conserves material usage in the rotor core; the provision of such a dynamoelectric machine which securely retains permanent magnets on the rotor core; the provision of such a dynamoelectric machine which retains slot liners within its stator core slots; the provision of such a machine which minimizes flux leakage between adjacent teeth of the stator core; and the provision of such a dynamoelectric machine which is readily manufactured.

Generally, a dynamoelectric machine of the present invention comprises a stator including a stator core, a winding on the stator core and a stator bore in the stator core. A rotor includes a rotor core, a permanent magnet mounted on the rotor core periphery and a rotor shaft mounted on the rotor core. The rotor shaft is supported by bearing means for rotation relative to the stator with the rotor core generally received in the stator bore. The permanent magnet has a greater axial dimension than the rotor core so that the permanent magnet has a portion projecting axially outwardly beyond an end of the rotor core. A position sensor is disposed at least partially in radially overlapping position with the position of the portion of the permanent magnet projecting axially outwardly beyond the end of the rotor core.

In another aspect of the invention, a rotor as set forth in the preceding paragraph is disclosed.

In still another aspect of the invention, a dynamoelectric machine comprising a stator substantially as described above, and a rotor including a rotor core and a rotor shaft mounted on the rotor core. The rotor shaft is supported by bearing means as set forth in the preceding description. The stator core generally comprises a plurality of stator laminations stamped from ferromagnetic sheet material arranged in a stack to form the stator core. Each stator lamination has an inner diameter, an outer diameter, a central opening and a plurality of slots on the inner diameter opening into the central opening. Each slot includes a radially outer boundary, opposing side boundaries and a radially inner boundary. The radially inner boundary comprises first segments extending from opposite side boundaries of the slot toward each other. The first segments are substantially parallel with and in opposed relation to the radially outer boundary. Second segments extend from the first segments toward each other, the second segments being generally linear and lying at an angle to the radially outer boundary and first segment of the radially inner boundary.

In a further aspect of the invention, a stator lamination as set forth in the preceding paragraph is disclosed.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
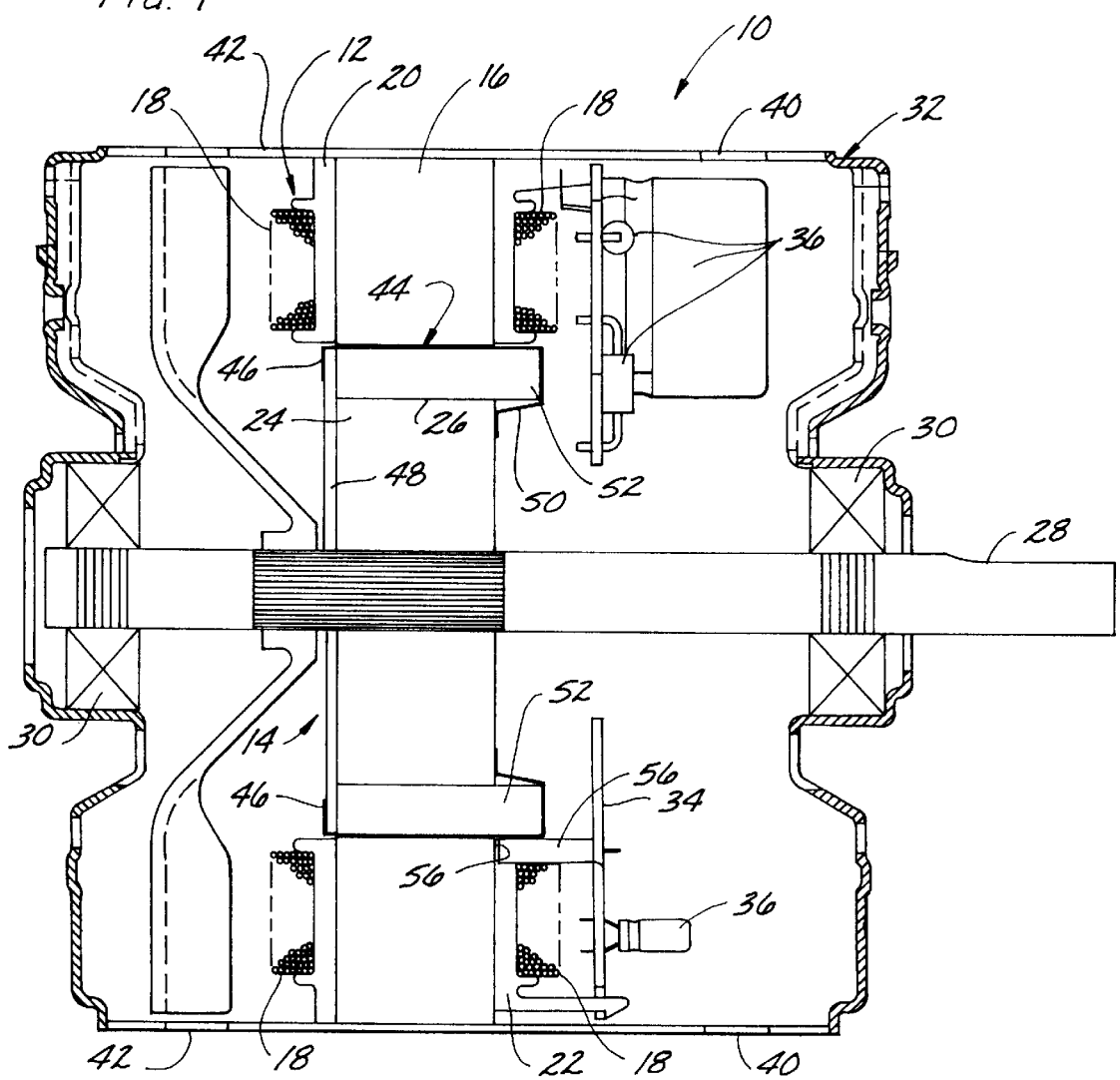
FIG. 1 is a longitudinal section of an electric motor illustrating the overhang of permanent magnets of on a rotor core of the motor.
Figure 2:
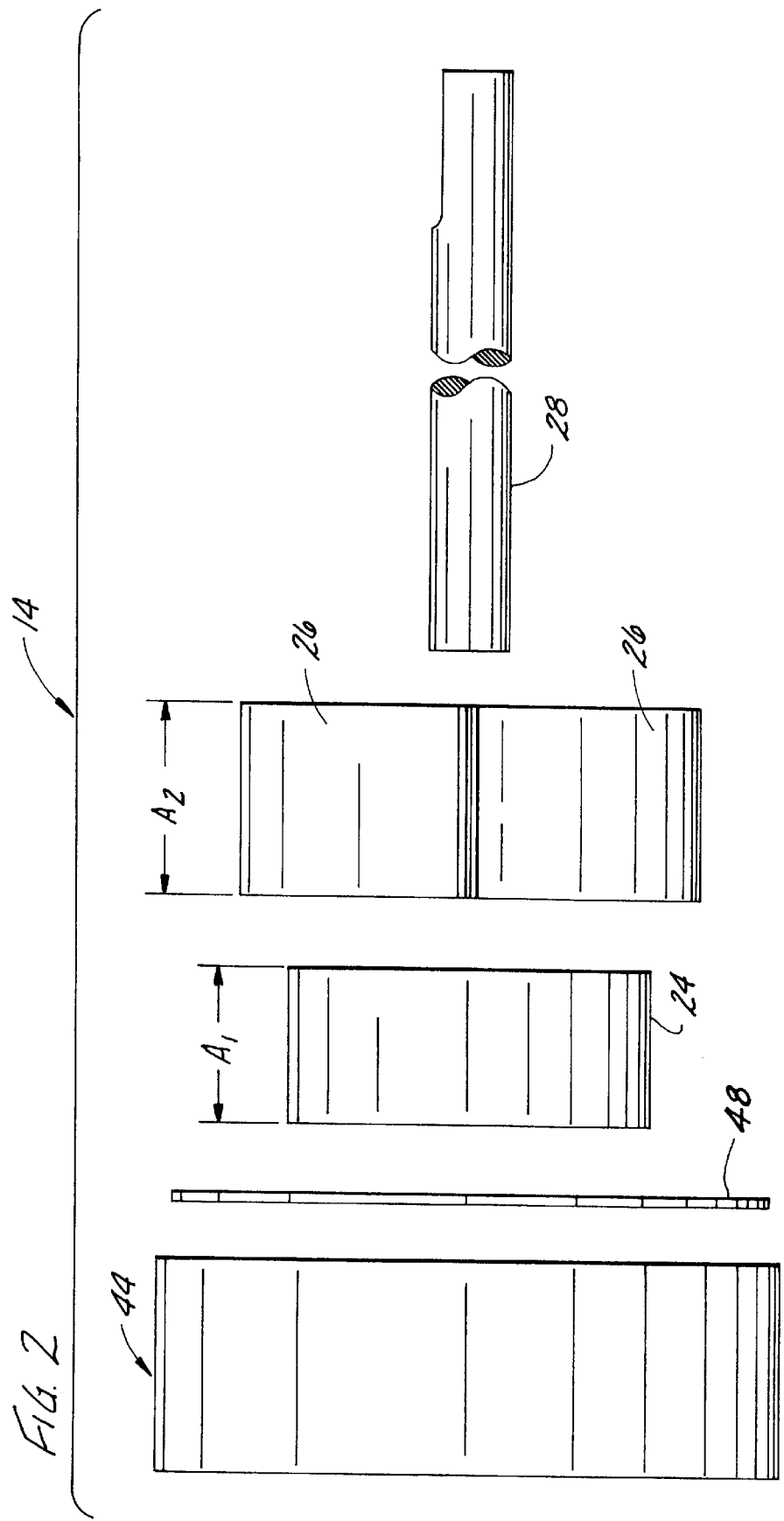
FIG. 2 is an exploded elevational view of the rotor.

Referring now to the drawings, and in particular to FIGS. 1 and 2, a dynamoelectric machine in the form of an electric motor is indicated generally at 10. The motor includes a stator and rotor, indicated generally at 12 and 14, respectively. The stator comprises a stator core 16 having a central stator bore and windings 18 wound on the stator core. In addition, annular stator end caps (designated at 20 and 22, respectively) are mounted on respective axial ends of the stator core 16. The rotor 14 includes a rotor core 24 received in the stator bore, three permanent magnets 26 (only two are shown) on its periphery and a rotor shaft 28 mounted on the rotor core. The rotor shaft 28 is supported at opposite ends in roller bearings 30 mounted on a motor housing indicated generally at 32 for rotation of the rotor 14 relative to the housing and the stator 12. A printed circuit board 34 mounts various power and control circuitry components 36 for controlling operation of the motor 10, including particularly commutation of the windings 18. The construction of the power and control circuitry is well known to those of ordinary skill in the art, and will not be further described herein. A fan blade 38 is mounted on the rotor shaft 28 for conjoint rotation therewith inside the housing 32 for drawing air into the housing through vents 40 near the opposite end of the housing, over the printed circuit board 34, stator 12 and rotor 14, and out of the housing through vents 42.

The rotor core 24 is suitably formed such as by stacking a plurality of annular rotor laminations (not shown) stamped from ferromagnetic sheet material and securing the laminations together in the stack. There are three permanent magnets 26 in the illustrated embodiment, each extending about 120° so that when the permanent magnets are placed on the periphery of the rotor core 24, they substantially encircle the rotor core. A tubular retaining shell made of stainless steel (generally indicated at 44) is has an axial edge margin which is bent over to form a flange 46 to reduce the diameter of the shell opening at one end. An annular rotor core cap 48 is first placed in the shell 44 against the flange 46, followed by the rotor core 24 and the rotor shaft 28 previously mounted on the rotor core. The permanent magnets 26 are then placed around the rotor core 24 in the shell 44 and the opposite axial end margin 50 of the shell is formed over the ends of the magnets and into engagement with the rotor core to secure the permanent magnets on the rotor core. Of course, the assembly of the rotor 14 may be other than described without departing from the scope of the present invention. In particular, the opposite end margin 50 may be formed first, prior to insertion of the components of the rotor. In that event, the flange 46 would be formed last to secure the components in the shell 44.

As illustrated in FIG. 2, the rotor core 24 has an axial dimension $A_1$ (e.g., 1 inch) and the permanent magnets 26 have an axial dimension $A_2$ (e.g., 1.3 inches) which is greater than $A_1$. Thus as assembled, portions 52 the permanent magnets project beyond (i.e., overhang) one axial end of the rotor core 24 (FIG. 1). The stator core 16 has substantially the same axial dimension ($A_1$) as the rotor core 24, and the stator and rotor cores are substantially in axial registration so that the permanent magnets 26 also project axially outwardly from one axial end of the stator core. The ends of the permanent magnets 26 opposite the overhanging portions 52 are generally in radial registration with the opposite ends of the rotor core 24 and stator core 16. However, the permanent magnets may extend beyond both axial ends of the stator and rotor cores 16, 24 without departing from the scope of the present invention.

A Hall device 54 is mounted on the printed circuit board 34 and extends axially inwardly from the printed circuit board into a pocket 56 formed on the stator end cap 22. As shown in FIG. 1, a portion of the Hall device 54 radially overlaps the overhanging portions 52 of the permanent magnets 26. In this position, the Hall device 54 is capable of monitoring the magnetic field variations as the permanent magnets 26 turn with the rotor core 24, so as to sense the position of the rotor core. The Hall device 54 signals the rotor position to the control circuitry on the printed circuit board 34 for use in commutating the windings 18 on the stator.

Figure 3:
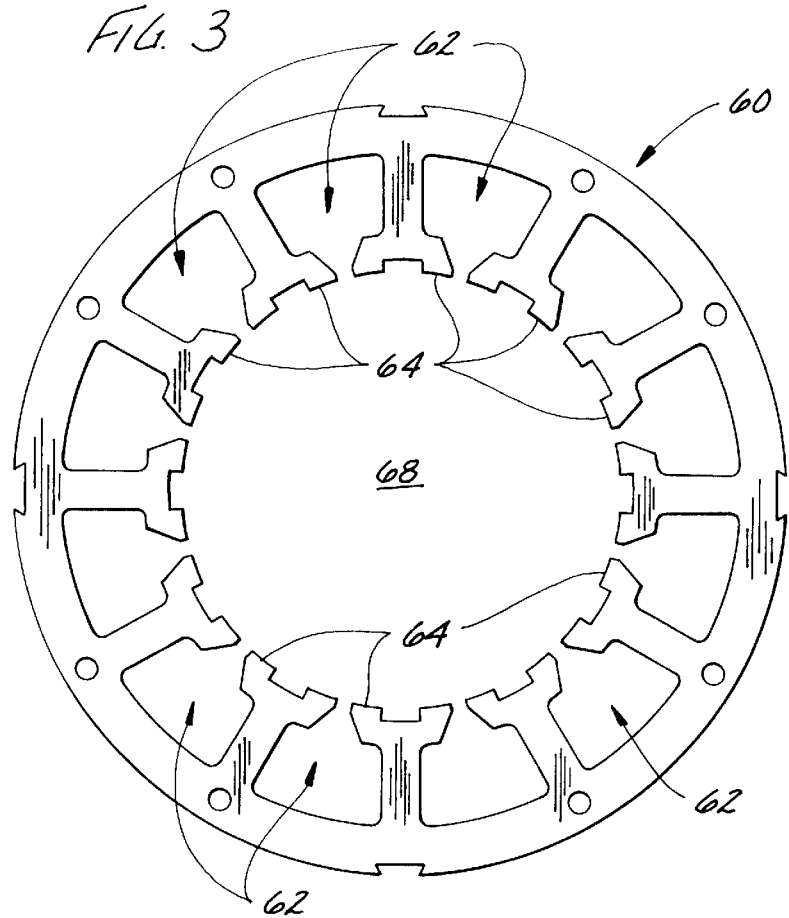
FIG. 3 is a plan view of a stator lamination forming the stator core of the motor.

The stator core 16 is also made up of a stack of stator laminations, one of which is indicated generally at 60 in FIG. 3 of the drawings. Plural stator laminations like the stator lamination 60 are stamped from ferromagnetic sheet material, stacked together and secured in the stack to form the stator core 16. Each stator lamination 60 has slots, generally indicated at 62, for receiving the magnet wire of the windings 18. Adjacent pairs of slots 62 define stator lamination teeth 64. As assembled in the stator core 16, the slots 62 of the stator laminations are aligned to define stator core slots 62' and the teeth 64 of the stator laminations are aligned to form stator core teeth 64'. Parts of the stator core 16 corresponding to parts on the individual stator lamination 60 will be designated by the same reference numerals with the addition of a prime after the numeral. The stator end caps 20, 22 are secured on opposite axial ends of the stator core 16 and slot liners (generally indicated at 66 in FIG. 5) are inserted into the stator core slots 62'. The windings 18 are wound on the core with the magnet wire being received in the slot liners 66 in the stator core slots 62'. FIG. 1 illustrates portions of the ends of two coils of the windings 18 formed on two respective stator core teeth 64' which extend around the end caps.

Figure 4:
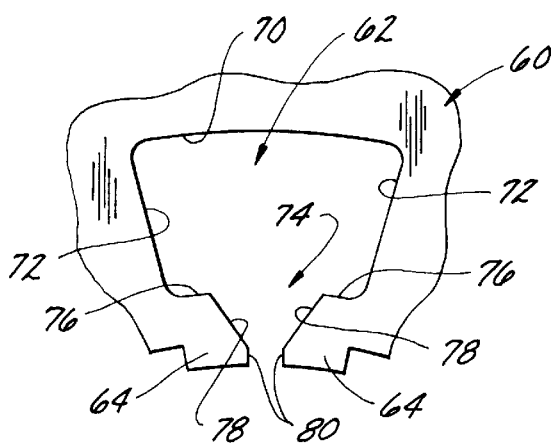
FIG. 4 is an enlarged, fragmentary plan view of the stator lamination showing one slot therein.

Referring again to FIG. 3, each stator lamination 60 has an inner diameter, an outer diameter, a central opening 68. The slots 62 open into the central opening. As shown in FIG. 4, each slot 62 has a radially outer, generally arcuate boundary 70, opposing generally radially extending side boundaries 72 and a radially inner boundary generally indicated at 74. The radially inner boundary 74 includes first segments 76 extending from radially inner ends of opposite side boundaries 72 of the slot 62 toward each other, and second segments 78 extending toward each other from the free ends of the first segments. The first segments 76 are substantially parallel with and in opposed relation to the radially outer boundary 70. The second segments 78 are generally linear and extend from the first segments 76 toward the free ends of the teeth 64 at an angle to the radially outer boundary 70 of the slot. Third segments 80 extend from the second segments 78 in generally radial directions to the intersection of the slot 62 with the central opening 68 of the lamination 60. It is envisioned that the second segments could beneficially extend all the way to the central opening (not shown). However, in order to make it more feasible to punch the stator laminations 60, a slight rounding off near the intersection is needed. The third segment 80 is produced by the rounding off of the slot 62 immediately at the central opening 68.

Figure 5:
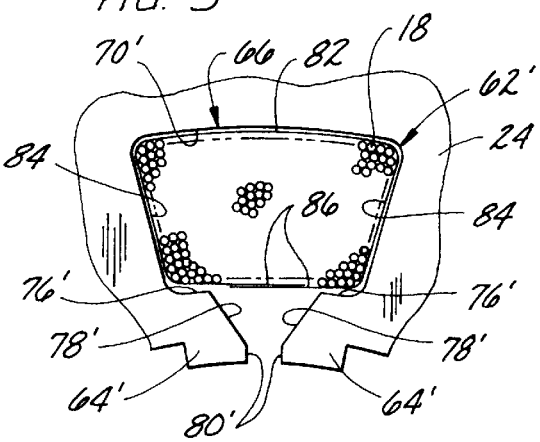
FIG. 5 is an enlarged, fragmentary end view of a stator core of the motor illustrating a slot liner and magnet wire received in a stator core slot.

In the illustrated embodiment, the slot liners 66 each comprise a sheet of electrically insulating sheet material (e.g., mylar sheet material) which is folded into the shape of a tube having a trapezoidal cross section. As shown in FIG. 5, the slot liner 66 has a transverse wall 82, opposing side walls 84 and deflectable flaps 86 extending from edges of the side walls. The flaps 86 overlap so that the slot liner 66 completely encircles the magnet wire in the slots 62'. However, the flaps 86 can be deflected apart by magnet wire being wound on the stator core 16 to permit the wire to enter the slot 62'.

The slots 62 of the stator laminations are particularly formed to facilitate retaining the slot liners 66 in the stator core slots 62' formed by the laminations, while minimizing flux leakage between teeth 64' on opposite sides of each slot. The parallel, opposed relation of the first segments 76' hold the slot liner 66 securely within the slot 62' and inhibits slippage of the slot liner out of the slot into the stator bore. The flaps 86 of the slot liner 66 engaging the first segments 76' are held from radially inwardly movement. Should the slot liner 66 tend to slip along the first segments 76', the flaps 86 would have to move toward each other against the bias of the sheet material. Moreover, the magnet wire in the slots 62' also tends to wedge the side walls 84 of the slot liner 66 apart and thereby inhibit such movement by the flaps 86 along the first segments.

The second segments 78' of the radially inner boundary 74' provide a greater separation of the teeth 64' on opposite sides of the slot 62' so that there is a more pronounced air gap between the radially inner ends of the teeth 64'. Flux leakage between adjacent teeth 64' is reduced. Only the third segments 80' approach each other close enough to have appreciable flux leakage. Thus it may be seen that the slot 62' is formed to retain the slot liner 66 within the slot and at the same time minimize flux leakage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dynamoelectric machine comprising a stator including a stator core, a winding on the stator core and a stator bore in the stator core, a rotor including a rotor core, a permanent magnet mounted on the rotor core periphery and a rotor shaft mounted on the rotor core, bearing means for supporting the rotor shaft for rotation relative to the stator with the rotor core generally received in the stator bore, the permanent magnet having a greater axial dimension than the rotor core so that the permanent magnet has a portion projecting axially outwardly beyond an end of the rotor core, and a position sensor disposed at least partially in radially overlapping position with the position of the portion of the permanent magnet projecting axially outwardly beyond the end of the rotor core and at least partially disposed within an axial projection of the periphery of the stator core.

2. A dynamoelectric machine as set forth in claim 1 wherein the stator core and the rotor core have substantially the same axial dimension.

3. A dynamoelectric machine as set forth in claim 2 wherein the stator core and rotor core in the stator bore are in axial registration with each other, the permanent magnet portion projecting outwardly from the end of the rotor core also projecting outwardly from an end of the stator core.

4. A dynamoelectric machine as set forth in claim 3 wherein the permanent magnet projects axially outwardly from only one axial end of the rotor core and stator core.

5. A dynamoelectric machine as set forth in claim 4 further comprising a plurality of permanent magnets mounted on the periphery of the rotor core, each permanent magnet projecting beyond said one axial end of the stator core and rotor core, and a tubular shell receiving the rotor core therein, the tubular shell having axially opposite end margins formed over the ends of the permanent magnets for securing the magnets on the rotor core.

6. A dynamoelectric machine as set forth in claim 5 wherein the position sensor comprises a Hall device, and wherein the machine further comprises a circuit board mounting the Hall device thereon, the Hall device extending axially from the circuit board to a position radially overlapping the position of the portions of the permanent magnets projecting beyond the axial ends of the stator core and rotor core.

7. A dynamoelectric machine as set forth in claim 5 wherein the stator core comprises a plurality of stator laminations stamped from ferromagnetic sheet material arranged in a stack to form the stator core, each stator lamination having an inner diameter, an outer diameter, a central opening and a plurality of slots on the inner diameter opening into the central opening, each slot including a radially outer boundary, opposing side boundaries and a radially inner boundary, the radially inner boundary comprising first segments extending from opposite side boundaries of the slot toward each other, the first segments being substantially parallel with and in opposed relation to the radially outer boundary, and second segments extending from the first segments toward each other, the second segments being generally linear and lying at an angle to the radially outer boundary and first segment of the radially inner boundary.

8. A dynamoelectric machine as set forth in claim 7 wherein each stator lamination slot further comprises third segments extending radially from the second segments to the central opening.

9. A dynamoelectric machine as set forth in claim 8 wherein each stator lamination slot is aligned with other stator lamination slots in the stator core to define a stator core slot, a slot liner in each of the stator core slots, the slot liner comprising a transverse wall, opposing side walls projecting outwardly from opposite edge margins of the transverse wall, and deflectable flaps projecting inwardly from the free edge margins of the side walls generally opposite the transverse wall, the transverse wall being engageable with the radially outer boundary and the deflectable flaps being engageable with respective first segments of the inner boundary thereby to retain the slot liner in the stator core slot.

10. A rotor for a dynamoelectric machine comprising a rotor core, a plurality of permanent magnets mounted on the rotor core periphery and a rotor shaft mounted on the rotor core, each permanent magnet having a greater axial dimension than the rotor core so that the permanent magnet projects axially outwardly beyond an end of the rotor core, and means for securing the permanent magnet to the rotor core, wherein said securing means comprises a tubular shell receiving the rotor core therein, the tubular shell having axially opposite end margins formed over the ends of the permanent magnets for securing the magnets on the rotor core.

11. A rotor as set forth in claim 10 wherein the permanent magnet projects axially beyond one axial end of the rotor core but does not project axially beyond an opposite axial end of the rotor core.

12. A rotor as set forth in claim 11 wherein an axial end of the permanent magnet is substantially in registration with said opposite axial end of the rotor core.

13. A dynamoelectric machine comprising a stator including a stator core, a winding on the stator core and a stator bore in the stator core, a rotor including a rotor core and a rotor shaft mounted on the rotor core, bearing means for supporting the rotor shaft for rotation relative to the stator with the rotor core generally received in the stator bore, the stator core comprising a plurality of stator laminations stamped from ferromagnetic sheet material arranged in a stack to form the stator core, each stator lamination having an inner diameter, an outer diameter, a central opening and a plurality of slots on the inner diameter opening into the central opening, each slot including a radially outer boundary, opposing side boundaries and a radially inner boundary, the radially inner boundary comprising first segments extending from opposite side boundaries of the slot toward each other, the first segments being substantially parallel with and in opposed relation to the radially outer boundary, and second segments extending from the first segments toward each other, the second segments being generally linear and lying at an angle to the radially outer boundary and first segment of the radially inner boundary.

14. A dynamoelectric machine as set forth in claim 13 wherein each stator lamination slot further comprises third segments extending radially from the second segments to the central opening.

15. A dynamoelectric machine as set forth in claim 13 wherein each stator lamination slot is aligned with other stator lamination slots in the stator core to define a stator core slot, a slot liner in each of the stator core slots, the slot liner comprising a transverse wall, opposing side walls projecting outwardly from opposite edge margins of the transverse wall, and deflectable flaps projecting inwardly from the free edge margins of the side walls generally opposite the transverse wall, the transverse wall being engageable with the radially outer boundary and the deflectable flaps being engageable with respective first segments of the inner boundary thereby to retain the slot liner in the stator core slot.

16. A dynamoelectric machine as set forth in claim 13 wherein the permanent magnet has a greater axial dimension than the rotor core so that the permanent magnet has a portion projecting axially outwardly beyond an end of the rotor core, and wherein the dynamoelectric machine further comprises a position sensor disposed at least partially in radially overlapping position with the position of the portion of the permanent magnet projecting axially outwardly beyond the end of the rotor core and at least partially disposed within an axial projection of the periphery of the stator core.

17. A dynamoelectric machine as set forth in claim 16 wherein the stator core and rotor core in the stator bore are in axial registration with each other, the permanent magnet portion projecting outwardly from the end of the rotor core also projecting outwardly from an end of the stator core.

18. A dynamoelectric machine as set forth in claim 17 further comprising a plurality of permanent magnets mounted on the periphery of the rotor core, each permanent magnet projecting beyond the axial ends of the stator core and rotor core, and a tubular shell receiving the rotor core therein, the tubular shell having axially opposite end margins formed over the ends of the permanent magnets for securing the magnets on the rotor core.

19. A dynamoelectric machine as set forth in claim 18 wherein the position sensor comprises a Hall device, and wherein the machine further comprises a circuit board mounting the Hall device thereon, the Hall device extending axially from the circuit board to radially overlap the portions of the permanent magnets projecting beyond the axial ends of the stator core and rotor core.

20. A stator lamination for use in forming a stator core by stacking the stator lamination together with other stator laminations, the stator lamination comprising a piece stamped from ferromagnetic sheet material having an inner diameter, an outer diameter, a central opening and a plurality of slots on the inner diameter opening into the central opening, each slot including a radially outer boundary, opposing side boundaries and a radially inner boundary, the radially inner boundary comprising first segments extending from opposite side boundaries of the slot toward each other, the first segments being substantially parallel with and in opposed relation to the radially outer boundary, and second segments extending from the first segments toward each other, the second segments being generally linear and lying at an angle to the radially outer boundary and first segment of the radially inner boundary.

21. A stator lamination as set forth in claim 20 wherein each stator lamination slot further comprises third segments extending radially from the second segments to the central opening.

22. A stator lamination as set forth in claim 20 in combination with other stator laminations of the substantially the same construction, the stator laminations being stacked together with their stator lamination slots in registration to form a stator core having stator core slots, and a slot liner in each of the stator core slots, the slot liner comprising a transverse wall, opposing side walls projecting outwardly from opposite edge margins of the transverse wall, and deflectable flaps projecting inwardly from the free edge margins of the side walls generally opposite the transverse wall, the transverse wall being engageable with the radially outer boundary and the deflectable flaps being engageable with respective first segments of the inner boundary thereby to retain the slot liner in the stator core slot.

* * * * *